United States Patent
Wierenga et al.

(10) Patent No.: US 6,190,750 B1
(45) Date of Patent: Feb. 20, 2001

(54) REWRITABLE OPTICAL INFORMATION MEDIUM

(75) Inventors: Harm A. Wierenga; Johannes C. N. Rijpers, both of Eindhoven (NL)

(73) Assignee: U.S. Philips Corporation, New York, NY (US)

( * ) Notice: Under 35 U.S.C. 154(b), the term of this patent shall be extended for 0 days.

(21) Appl. No.: 09/310,481

(22) Filed: May 12, 1999

(30) Foreign Application Priority Data

May 12, 1998 (EP) .................................................. 98201552

(51) Int. Cl.[7] ....................................................... B32B 3/02
(52) U.S. Cl. ........................ 428/64.1; 428/64.4; 428/64.5; 428/457; 428/913; 430/270.13; 430/495.1; 430/945; 369/283; 369/288

(58) Field of Search ................................. 428/64.1, 64.2, 428/64.4, 64.5, 64.6, 457, 913; 430/270.13, 495.1, 945; 369/283, 288

(56) References Cited

FOREIGN PATENT DOCUMENTS

WO9750084   12/1997  (WO) .............................. G11B/7/24

Primary Examiner—Elizabeth Evans
(74) Attorney, Agent, or Firm—Norman N. Spain

(57) ABSTRACT

A rewritable single-sided double layer optical information medium having a first recording stack with a phase change recording layer sandwiched between two dielectric layers. The recording stack is sufficiently transmissive to ensure proper reading/writing of the second recording stack. For this purpose, the recording stack includes a thin metal layer and a further dielectric layer. The laser beam can be focused on the first recording stack or on the second recording stack, thus doubling the storage capacity of the recording medium.

10 Claims, 1 Drawing Sheet

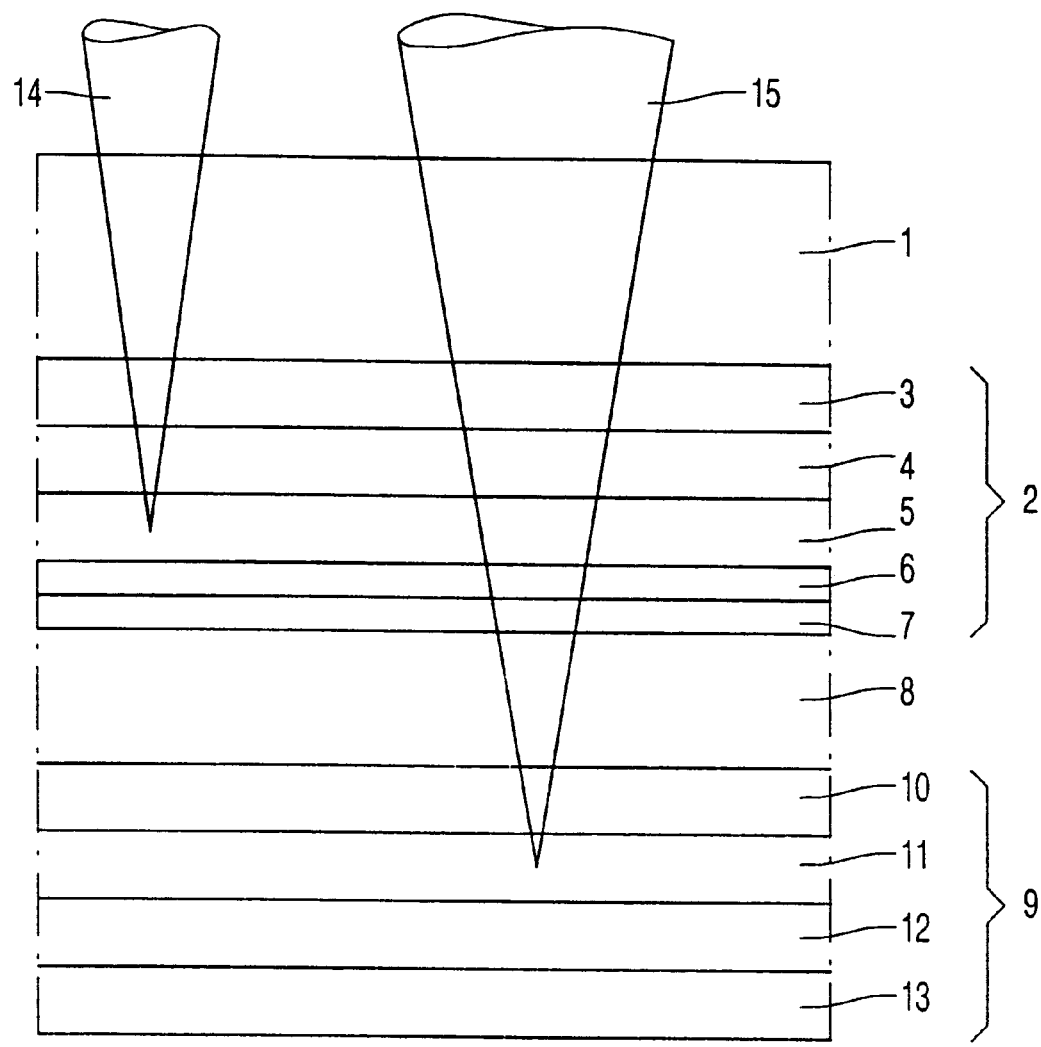

REWRITABLE OPTICAL INFORMATION MEDIUM

FIELD OF THE INVENTION

The invention relates to the field of optical information medium for rewritable double layer recording using of a laser-light beam, the medium including a substrate having disposed on the same side thereof two recording stacks both having a phase change type recording layer.

BACKGROUND OF THE INVENTION

Optical information or data storage based on the phase change principle is attractive, because it combines the possibilities of direct overwrite (DOW) and high storage density with easy compatibility with read-only systems. Phase-change optical recording involves the formation of submicrometer-sized amorphous recording marks in a thin crystalline film, using a focused laser-light beam. During recording information, the medium is moved with respect to the focused laser-light beam which is modulated in accordance with the information to be recorded. Due to this, quenching takes place in the phase-change recording layer and causes the formation of amorphous information bits in the exposed areas of the recording layer, which remains crystalline in the unexposed areas. Erasure of written amorphous marks is realized by recrystallizing through heating with the same laser. The amorphous marks represent the data bits, which can be reproduced via the substrate by a low-power focused laser-light beam. Reflection differences of the amorphous marks, with respect to the crystalline recording layer, bring about a modulated laser-light beam which is subsequently converted by a detector into a modulated photocurrent (electronic signal) in accordance with the coded, recorded digital information.

One of the aims in optical recording is to increase the storage capacity of media like DVD-Rewritable and DVR (Digital Video Recorder) on a single-sided disc. This can be achieved by reducing the laser wavelength $\lambda$, and/or increasing the numerical aperture (NA), because the laser spot size is proportional to $(\lambda/NA)^2$. An alternative option is the application of multiple recording layers. When two recording layers on the same side of the optical disc are used, this is called double or dual layer recording.

An optical information medium of the phase change type having a single recording layer is known from the international patent application WO 97/50084 (PHN 15881) filed by Applicants. The known medium of the phase change type, includes a substrate carrying a stack of layers including a first dielectric layer of e.g. $(ZnS)_{80}(SiO_2)_{20}$, a phase change recording layer of a GeSbTe compound, a second dielectric layer, and a reflective metal mirror layer. Such a stack of layers can be referred to as an IPIM structure, wherein M represents a reflective or mirror layer, I represents a dielectric layer, and P represents a phase change recording layer. The metal layer serves not only as a reflective mirror, but also as a heat-sink to ensure rapid cooling for quenching the amorphous phase during writing. The known recording medium has a good cyclability, i.e. a large number of repeated writing and erasing operations are possible, is suitable for high speed recording, and shows a low jitter even after a large number of cycles. In that patent application, double layer recording is not disclosed.

For double layer recording, the first or upper recording stack must be sufficiently transmissive to ensure proper read/write characteristics of the second or lower recording stack. However, the known IPIM structure for rewritable phase change recording has a crystalline absorption of about 80% and a crystalline reflection of about 20%, thus ensuring a high temperature increase in the phase change recording layer, a high modulation, and proper tracking, with limited laser power. Since the IPIM structure is not transmissive, it is unsuitable as a first or upper recording stack, although it has a proper structure for the second or lower recording stack, where zero transmission is preferable. A possible solution could be the replacement of the mirror layer M by a transparent heat conductor such as aluminium nitride. However, the thermal conductivity of these materials in thin films still appears to be too low, and therefore their ability to rapidly reduce the temperature in the recording layer is insufficient.

SUMMARY OF THE INVENTION

It is an object of the invention to provide, inter alia, a single-sided rewritable double layer optical information medium having recording stacks with an IPIM structure, in which the storage capacity is doubled with respect to a single-layered information medium.

This object is achieved in accordance with the invention by an optical information medium as described in the opening paragraph, which includes, in this order:

- a first recording stack including a phase change type recording layer sandwiched between two dielectric layers, and a transparent metal layer and a further dielectric layer on the side of the first recording stack opposite the side of the first recording stack on which the laser-light beam is incident;
- a transparent spacer layer having a thickness larger than the depth of focus of the laser-light beam; and
- a second recording stack including a phase change type recording layer sandwiched between two dielectric layers, and a metal mirror layer on the side opposite the side of the second recording stack on which the laser-light beam is incident.

The optical information medium according to the invention has the following structure:
substrate |IPIMI$^+$|S| IPIM
wherein the IPIMI$^+$ stack is the first recording stack with the further dielectric layer I$^+$, S is a transparent spacer layer, IPIM is the second recording stack, and wherein I,P, and M have the above mentioned meaning. The laser-light beam is incident via the substrate.

The invention is based on the insight that the transmission of an IPIM stack is increased when the metal layer M is replaced by a thin metal film, which is transparent for the laser-light beam, in combination with a further dielectric layer. For example, the transmission of a recording stack with a 10 nm thick Ag layer can be increased by about 50% by the addition of a further dielectric layer, without adversely affecting the optical contrast between the amorphous and crystalline phase. For this reason the laser power for writing in the second recording stack can be reduced by about 50%.

The metal layer of the first recording stack is thin, i.e. it has a thickness between 10 and 30 nm. This thickness is sufficient for quenching the amorphous phase during writing, and allows sufficient transmission to ensure proper read/write characteristics of the second recording stack. The metal may be selected from Al, Cu, or Au, but is preferably made of Ag, because of its high transmissivity and good thermal conductivity.

The dielectric layers are preferably made of a mixture of ZnS and $SiO_2$, e.g. $(ZnS)_{80}(SiO_2)_{20}$. The layers may also be made of $SiO_2$, $Ta_2O_5$, $TiO2$, $ZnS$, $Si_3N_4$, $AlN$, $Al_2O_3$, $MgO$, $ZnO$, $SiC$, including their non-stoichiometric compositions. Especially the last six members are preferred because of their good thermal conductivity.

For the metal mirror layer of the second recording stack, metals such as Al, Ti, Au, Ni, Cu, Ag, Rh, Pt, Pd, Ni, Co, Mn and Cr, and alloys of these metals, can be used. Examples of suitable alloys are AlTi, AlCr and AlTa. The thickness of this metal mirror layer is not critical, but preferably the transmission is zero for obtaining maximal reflection. For practical reasons the thickness is about 100 nm.

The recording layer includes a phase change material showing a crystalline-amorphous phase transition. Known materials are e.g. alloys of In—Se, In—Se—Sb, In—Sb—Te, Te—Ge, Te—Se—Sb, Te—Ge—Se, or Ag—In—Sb—Te. Preferably, the recording layer includes a GeSbTe compound. Especially useful are the compounds described in the above mentioned international patent application WO 97/50084. These compounds have a composition defined in atomic percentages by the formula:

$$Ge_{50x}Sb_{40-40x}Te_{60-10x},$$

wherein $0.166 \leq x \leq 0.444$. These compositions are situated on the line connecting the compounds GeTe and $Sb_2Te_3$ in the triangular Ge—Sb—Te composition diagram, and include the stoichiometric compounds $Ge_2Sb_2Te_5$ (x=0.445), $GeSb_2Te_4$ (x=0.286) and $GeSb_4Te_7$ (x=0.166). These compounds show a fast crystallization (erasure) time.

Preferably, the recording layer of the first recording stack has a thickness between 5 and 15 nm. A thicker layer would result in too low a transmission. The recording layer of the second recording stack may be thicker, e.g. between 5 and 35 nm.

In the first recording stack, the dielectric layer between the substrate and the phase change recording layer protects the recording layer from humidity, the substrate from thermal damage, and optimises the optical contrast. From the viewpoint of jitter, the thickness of this dielectric layer is preferably at least 70 nm. In view of optical contrast, the thickness of this layer is limited to $(70+\lambda/2n)$ nm, wherein $\lambda$ is the wavelength of the laser-light beam, and n is the refractive index of the dielectric layer. In the second recording stack, the dielectric layer between the spacer layer and the recording layer has a thickness within the same range for the same reasons.

In both recording stacks, the dielectric layer between the recording layer and the metal (mirror) layer is between 10 and 50 nm, preferably between 20 and 40 nm. When this layer is too thin, the thermal insulation between the recording layer and the metal mirror layer is adversely affected. As a result, the cooling rate of the recording layer is increased, which leads to a poor crystallization process and a poor cyclability. The cooling rate will be decreased by increasing the thickness of the second dielectric layer.

The further dielectric layer of the first recording stack is optimized for a maximum transmission, and depends on the refractive index n of the dielectric material. E.g. when n=2 the thickness is about 60 nm, whereas for n=3 the thickness is about 32 nm.

The transparent spacer layer between the first and second recording stack has a thickness larger than the depth of focus of the laser-light beam, e.g. 10·m. This thickness ensures that the first and second recording stacks are optically decoupled, i.e. a laser-light beam focused on the (recording layer of the) first recording stack does not read/write information from/onto the second recording stack, and vice versa. In this way the storage capacity is doubled with respect to a single-layered information medium. The material of the spacer layer is e.g. a UV-cured acrylate adhesive, in which servotracks may be provided by a replication process.

The substrate of the information medium is at least transparent for the laser wavelength, and is made, for example, of polycarbonate, polymethyl methacrylate (PMMA), amorphous polyolefin or glass. In a typical example, the substrate is disc-shaped and has a diameter of 120 mm and a thickness of 0.6 or 1.2 mm. The laser-light beam enters the stack via the entrance face of the substrate.

The surface of the disc-shaped substrate on the side of the recording layer is, preferably, provided with a servotrack which can be scanned optically. This servotrack is often constituted by a spiral-shaped groove and is formed in the substrate by means of a mould during injection moulding or pressing. These grooves can be alternatively formed in a replication process in the synthetic resin of the spacer layer, for example, a UV light-curable acrylate Optionally, the outermost layer of the stack is screened from the environment by means of a protective layer of, for example, UV light-cured poly(meth)acrylate.

Recording and erasing can be achieved by using a short-wavelength laser, e.g. with a wavelength of 660 nm or shorter (red to blue).

Both the metal mirror layer, and the dielectric layers can be provided by vapour deposition or sputtering.

The phase change recording layer can be applied to the substrate by vacuum deposition, electron beam vacuum deposition, chemical vapour deposition, ion plating or sputtering.

Those skilled in the art will understand the invention and additional objects and advantages of the invention by studying the description of preferred embodiments below with reference to the following drawings which illustrate the features of the appended claims.

BRIEF DESCRIPTION OF THE DRAWINGS

The invention will be elucidated in greater detail by means of an exemplary embodiment and with reference to the accompanying drawing, in which the FIGURE shows a schematic cross-sectional view of an optical double layer information medium in accordance with the invention.

DETAILED DESCRIPTION OF THE PREFERRED EMBODIMENTS

Exemplary embodiment

The FIGURE schematically shows a part of a cross-section of a double layer optical information disc in accordance with the invention. The dimensions are not drawn to scale. Reference numeral 1 denotes a polycarbonate disc-shaped substrate having a diameter of 120 mm and a thickness of 0.6 mm. The substrate 1 is provided with: a first recording stack 2 with a IPIMI$^+$ structure comprising:

a dielectric layer 3 of $(ZnS)_{80}(SiO_2)_{20}$ with a thickness of 190 nm, a recording layer 4 of the compound $GeSb_2Te_4$ with a thickness of 6 nm, a dielectric layer 5 of $(ZnS)_{80}(SiO_2)_{20}$ with a thickness of 15 nm, a transparent silver layer 6 with a thickness of 15 nm, a further dielectric layer 7 of AlN with a thickness of 220 nm;

a spacer layer 8 of a UV-cured acrylate with a thickness of 50 μm;

a second recording stack 9 with an IPIM structure comprising:

a dielectric layer 10 of $(ZnS)_{80}(SiO_2)_{20}$ with a thickness of 190 nm, a recording layer 11 of the compound $GeSb_2Te_4$ with a thickness of 25 nm, a dielectric layer 12 of $(ZnS)_{80}(SiO_2)_{20}$ with a thickness of 15 nm, an aluminium mirror layer 13 with a thickness of 100 nm.

The initial crystalline state of the recording layers 4 and 11 is obtained by heating the as-deposited amorphous alloy with a focused laser beam in a recorder.

A laser-light beam 14 for recording, reproducing and erasing of information is focused onto recording stack 2, and enters the stack 2 via the substrate 1. Laser-light beam 15 is focused onto recording layer 11 of the second recording stack 9.

The first recording stack has a transmission in the amorphous state of about 50%, and a transmission in the crystalline state of about 33%. The stack has good recording properties. The jitter is below 13% up to 4000 overwrite cycles.

According to the invention a rewritable single-sided double layer phase change optical information medium is provided, such as DVD-RAM or DVR, in which the storage capacity is doubled with respect to a single-layered recording medium.

The invention has been disclosed with reference to specific preferred embodiments, to enable those skilled in the art to make use the invention, and to describe the best mod contemplated for carrying out the invention. Those skilled in the art may modify or add to these embodiments or provide other embodiments without departing from the spirit of the invention. Thus, the scope of the invention is only limited by the following claims.

What is claimed is:

1. An optical information medium for rewritable double layer recording using a laser-light beam, comprising:

a substrate;

a multitude of layers disposed on the same side of the substrate and including:

a first recording stack including a phase change type recording layer sandwiched between two dielectric layers, and a transparent metal layer and a further dielectric layer on the side opposite the side of the first recording stack on which the laser-light beam is incident;

a transparent spacer layer having a thickness larger than the depth of focus of the laser-light beam; and a second recording stack including a phase change type recording layer sandwiched between two dielectric layers, and a metal mirror layer on the side opposite to the side of the second recording stack on which the laser-light beam is incident.

2. The medium of claim 1, in which the metal layer of the first recording stack has a thickness between 10 and 30 nm.

3. The medium of claim 1, in which the metal layer of the first recording stack includes silver.

4. The medium of claim 1, in which the spacer layer has a thickness of at least 10 μm.

5. The medium of claim 1, in which the recording layers include a GeSbTe compound.

6. The medium of claim 1, in which the further dielectric layer includes a compound selected from the group consisting of Al2O3, SiC, Si3N4, MgO, ZnO and AlN including their non-stoichiometric compositions.

7. The medium of claim 1 in which the thickness of the recording layer of the first recording stack is 5–15 nm and the thickness of the recording layer of the second recording stack is 5–35 nm and the thickness of the recording layer of the first stack is less than the thickness of the recording layer of the second stack.

8. The medium of claim 1 in which the spacer layer has a thickness of less than 50 μm.

9. The medium of claim 1 in which the metal layer of the first recording stack is a layer of a metal selected from the group consisting of Ag, Al, Cu and Au.

10. The medium of claim 1 in which the metal layer of the first recording stack is a layer consisting of Ag.

* * * * *